May 29, 1923.
S. E. SCHROEDER
1,457,290
APPARATUS FOR MAKING RUBBER ROLLERS
Filed Feb. 17, 1922
6 Sheets-Sheet 1
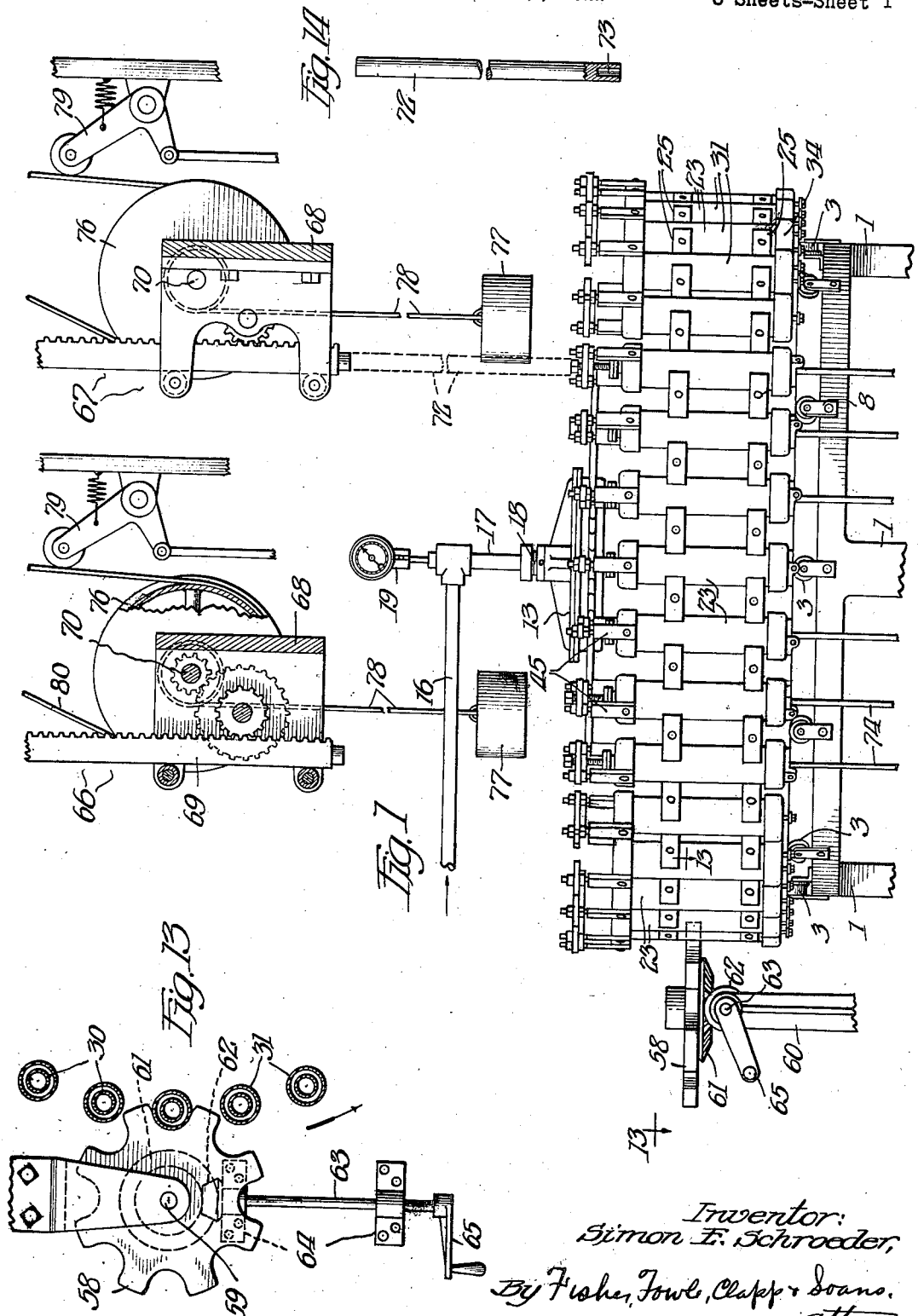

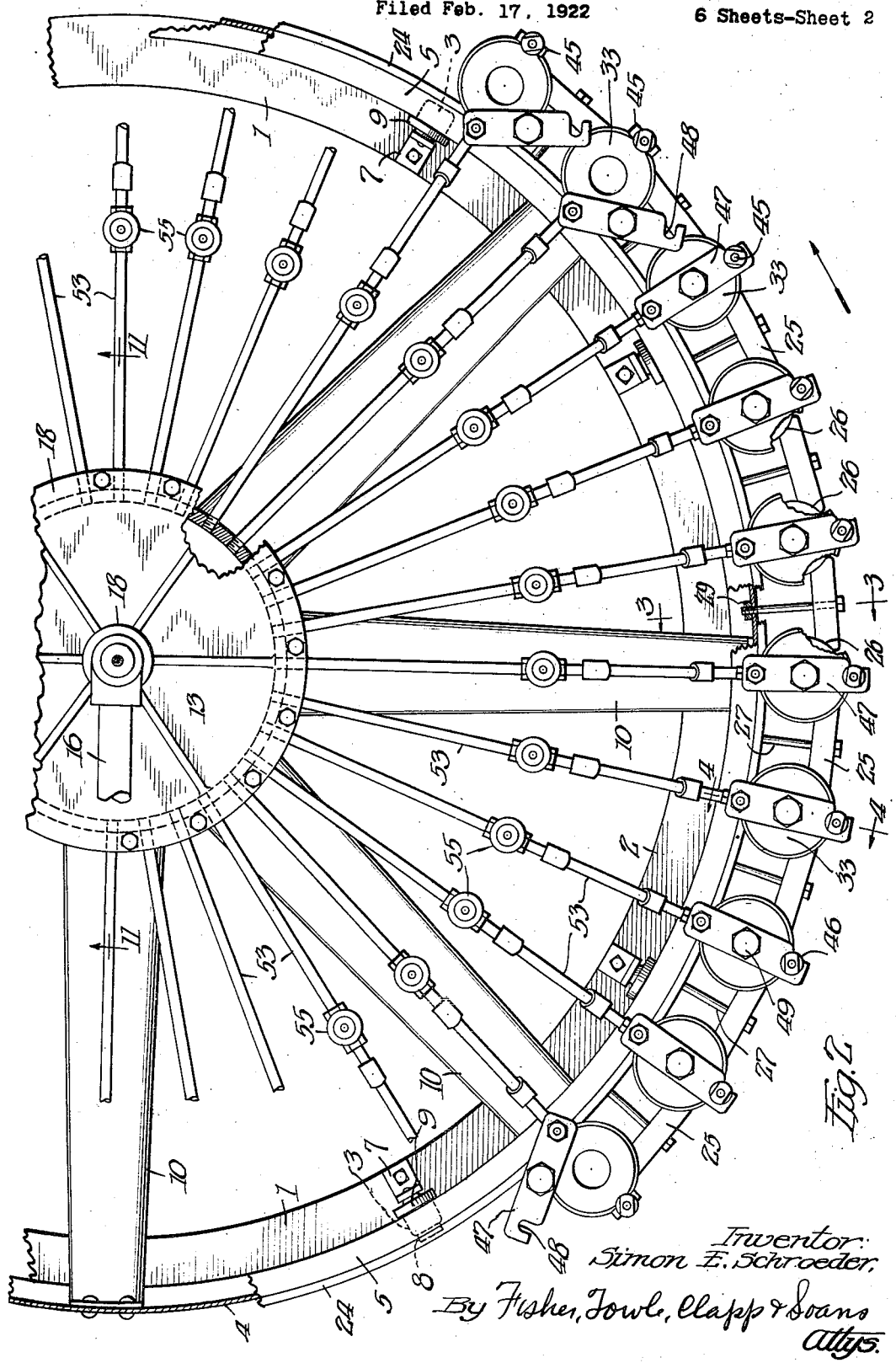

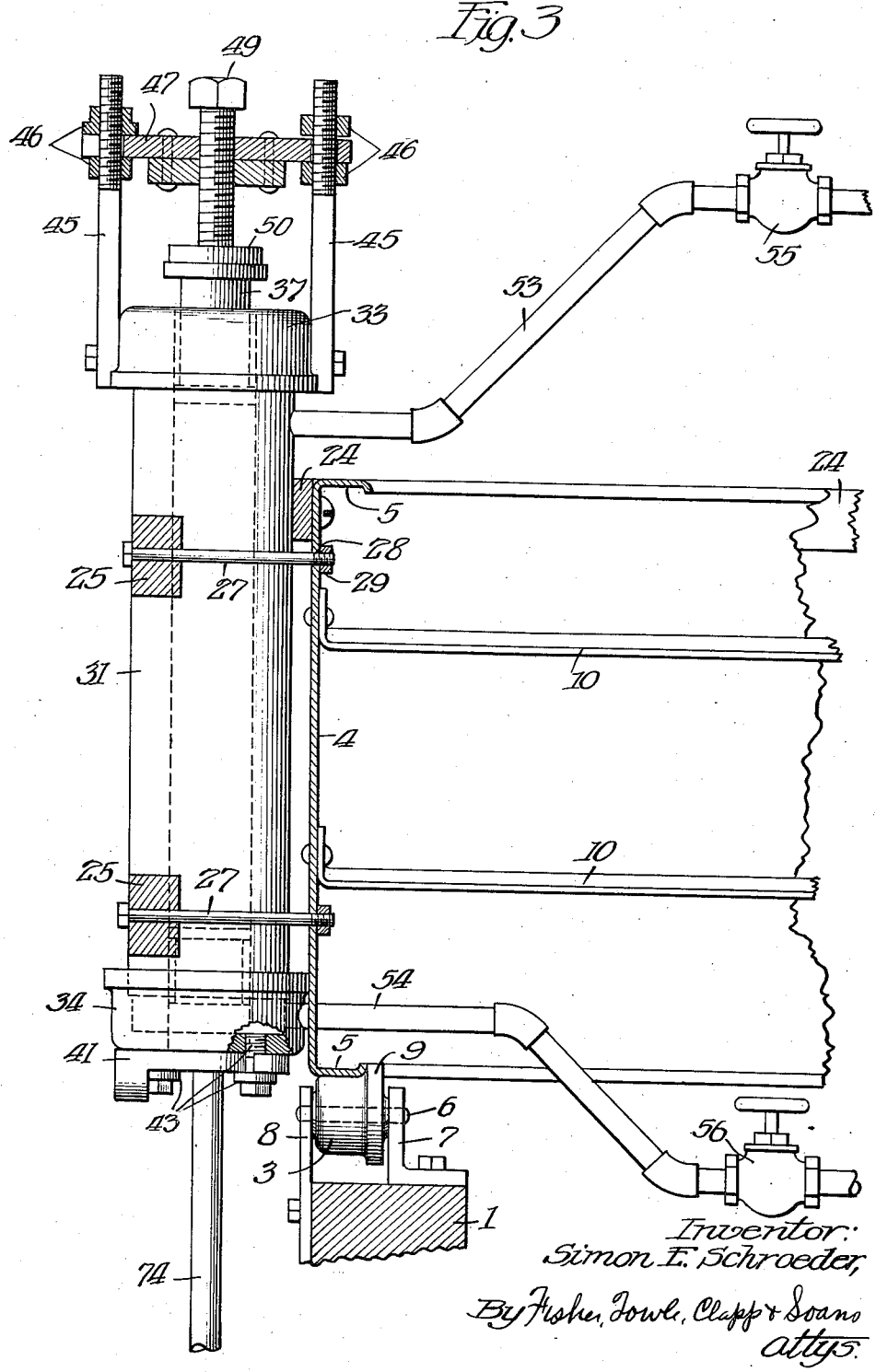

May 29, 1923.
S. E. SCHROEDER
1,457,290
APPARATUS FOR MAKING RUBBER ROLLERS
Filed Feb. 17, 1922
6 Sheets-Sheet 4
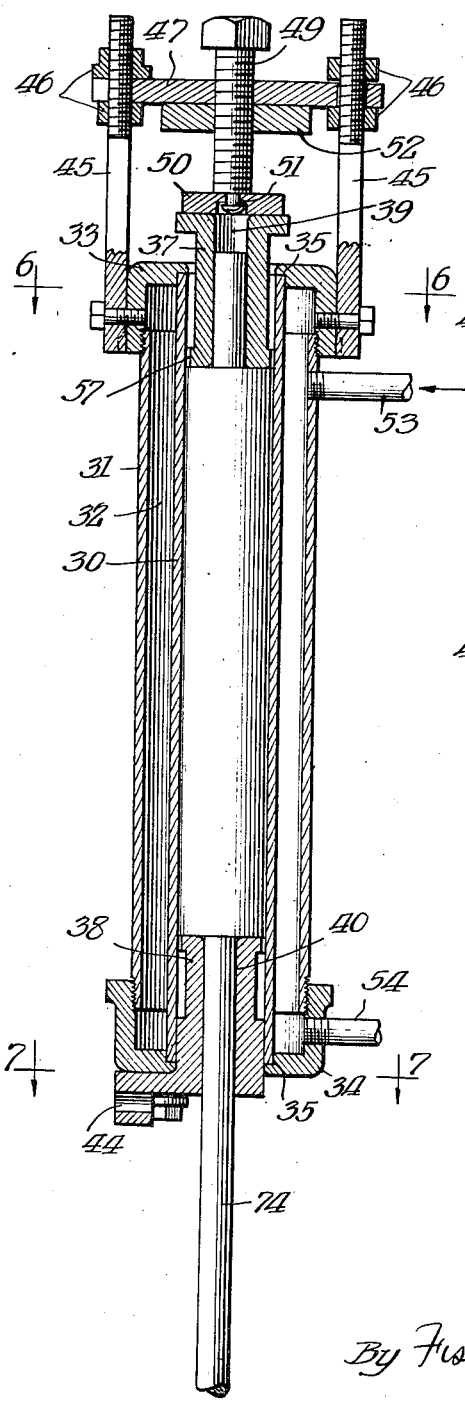
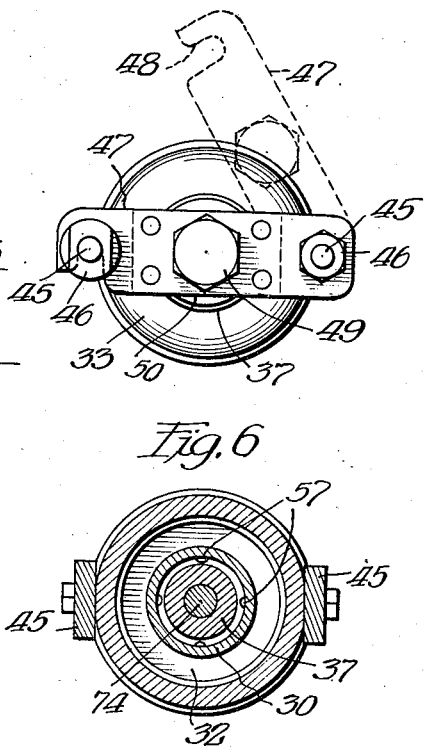
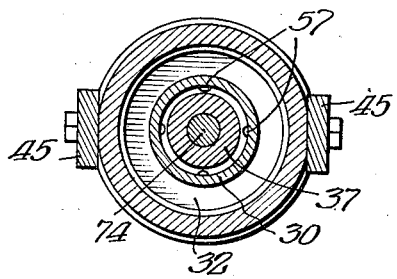
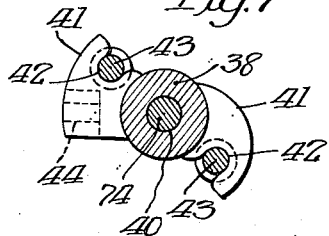
Inventor:
Simon E. Schroeder,
By Fisher, Dowle, Clapp & Soans
attys.

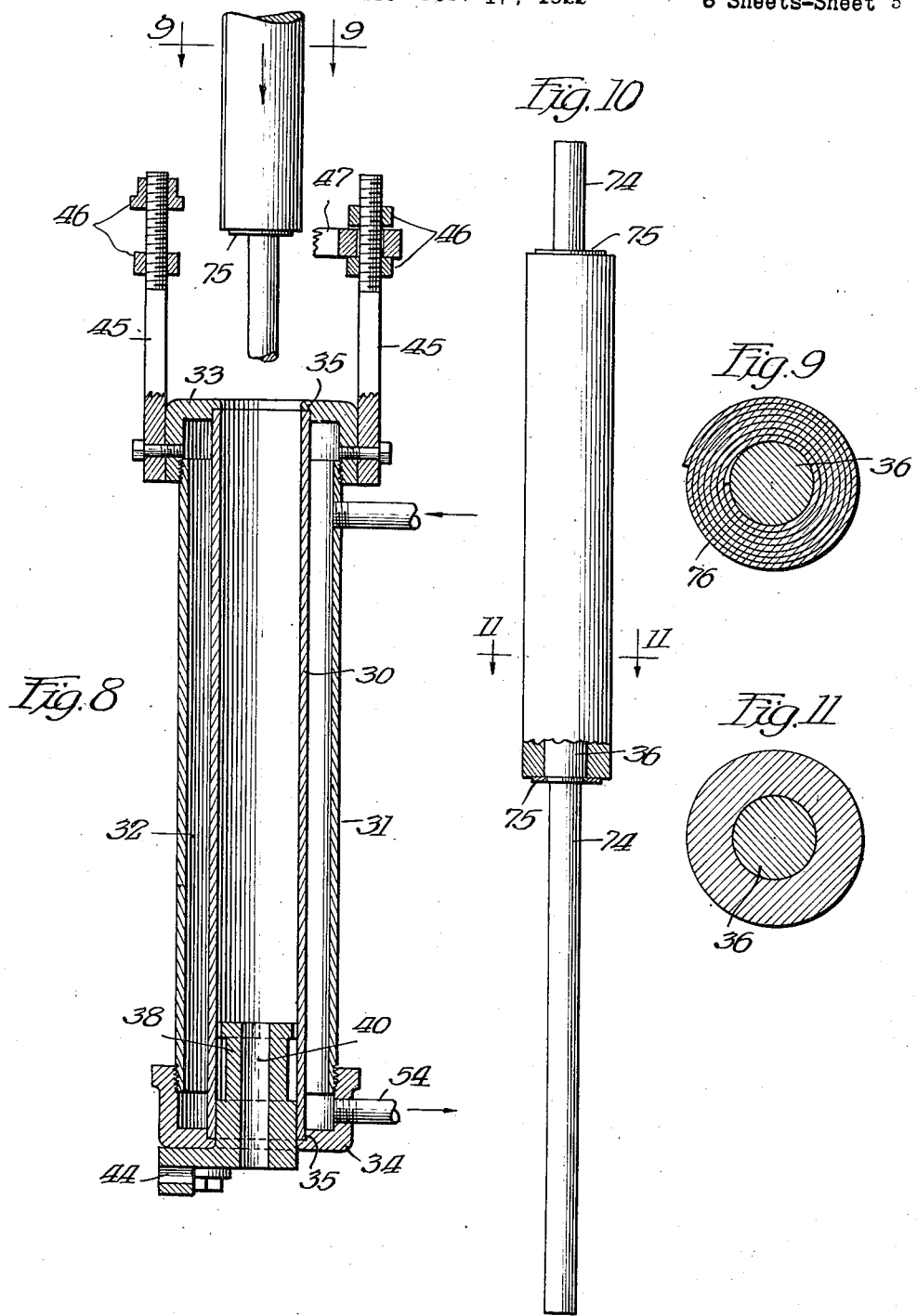

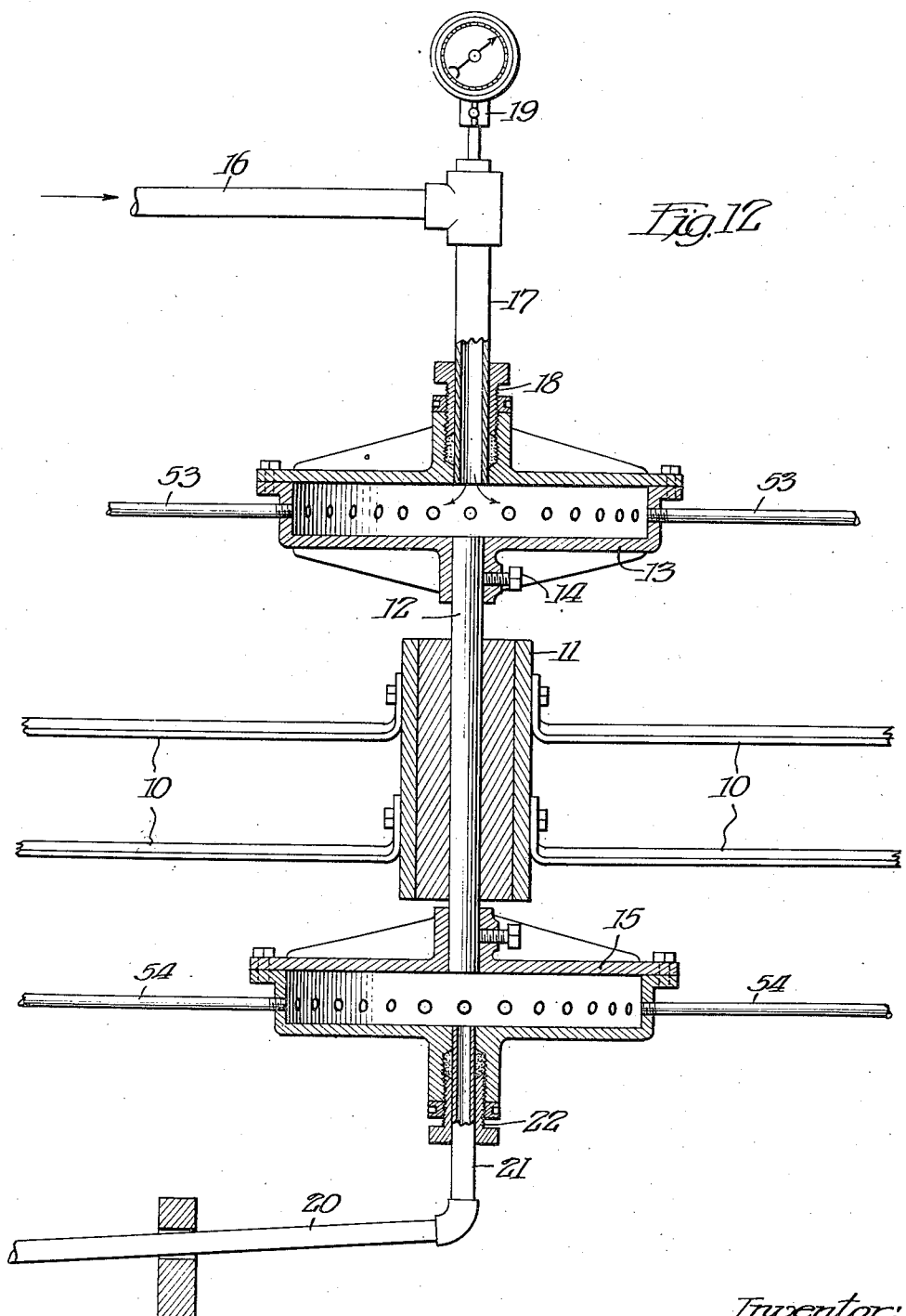

Patented May 29, 1923.

1,457,290

UNITED STATES PATENT OFFICE.

SIMON E. SCHROEDER, OF OAK PARK, ILLINOIS, ASSIGNOR TO WASHINGTON RUBBER CO., OF CICERO, ILLINOIS, A CORPORATION OF ILLINOIS.

APPARATUS FOR MAKING RUBBER ROLLERS.

Application filed February 17, 1922. Serial No. 537,143.

*To all whom it may concern:*

Be it known that I, SIMON E. SCHROEDER, a citizen of the United States, residing at Oak Park, in the county of Cook and State of Illinois, have invented certain new and useful Improvements in Apparatus for Making Rubber Rollers, of which the following is a specification.

My invention has reference more particularly to apparatus for making rubber rollers and the like wherein the roller is formed by vulcanizing the rubber in a mold.

In making rollers of this character, rubber which has been suitably prepared for vulcanizing, is packed or enclosed in a tubular mold or form and then vulcanized so as to consolidate the rubber and secure the desired elasticity or cushioning character. It is customary to effect vulcanization by placing a large number of such molds in a chamber, which is then closed and has steam introduced therein under pressure, for a suitable length of time to effect proper vulcanization, after which the molds are taken from the chamber and the rollers removed therefrom.

This method of manufacture, however, is slow and expensive as the molds must be removed and allowed to cool sufficiently for handling after each operation, and then replaced in the vulcanizer after being refilled. Moreover, a large amount of steam is wasted on account of opening up the vulcanizing chamber after each operation, and cooling the molds, as it is necessary to refill the vulcanizing chamber with a new supply of steam at each operation and also reheat the vulcanizer and molds.

The principal objects of my invention are to provide an improved apparatus for rapidly and economically making rubber rollers; to avoid the necessity of separately handling each mold; to permanently mount the molds so that the filling and emptying thereof is more readily accomplished; to move the molds in a predetermined path so that the molds are successively advanced to the positions of filling and emptying; to provide a suitable number of molds which move in an endless path and require a period of time for making the circuit sufficiently to effect proper vulcanization of the rollers; to avoid waste of steam occasioned by reheating the molds at each operation as in previous methods; to avoid the waste of steam occasioned in former methods by opening up the vulcanizing chamber after each operation; to provide a machine having a large capacity and occupying a small amount of space in comparison with the space required for a similar output with former methods of manufacture; and, in general, to provide a machine of this character whereby rubber rollers may be manufactured more conveniently than heretofore and without the waste of heat and loss of time.

On the drawings, Fig. 1 is a side view of a machine constructed in accordance with my invention;

Fig. 2, a fragmentary top view thereof;

Fig. 3, an enlarged sectional view on the line 3—3 of Fig. 2;

Fig. 4, a similar sectional view on the line 4—4 of Fig. 2.

Fig. 5, a top view of one of the molds, such as is shown in Fig. 4;

Fig. 6, a sectional view on the line 6—6 of Fig. 4;

Fig. 7, a sectional view on the line 7—7 of Fig. 4;

Fig. 8, a vertical sectional view of a mold showing part of a roller prepared for vulcanizing and ready to be inserted therein;

Fig. 9, a cross sectional view on the line 9—9 of Fig. 8 showing the roller preparatory to vulcanizing;

Fig. 10, a side view partly in section of the completed roller;

Fig. 11, a sectional view of the completed roller taken on the line 11—11 of Fig. 10;

Fig. 12, a sectional view on the line 11—11 of Fig. 2 showing the central construction of the mold carrying wheel and the steam drums through which steam is supplied and exhausted from the steam jackets of the molds;

Fig. 13, a top view of the mechanism for advancing the molds, showing a number of the adjacent molds in section on the line 13—13 of Fig. 1; and Fig. 14, a side view of the bar which is employed for ejecting the vulcanized rolls from the molds.

Referring to the drawings, the reference numeral 1 indicates a supporting frame or base which has a circular rim 2 at the top, upon which is mounted at intervals therearound a plurality of rollers 3. A wheellike frame is supported on these rollers so as to rotate thereon and comprises a wheel rim 4 with inturned flanges 5 extending around the upper and lower edge thereof and having the lower flange resting upon the rollers 3. Each roller is mounted on an axle 6, the ends of which are supported by the brackets 7 and 8 carried by the rim 2, and the roller is formed at its inner end with a flange 9 which engages against the inner edge of the lower flange 5 of the wheel rim 4 so as to retain the wheel in the required circle of movement.

A number of spokes 10 extend inwardly and are connected at their inner ends to a hub 11 in which an upright shaft 12 is secured. This shaft projects both above and below the hub and has a steam drum 13 secured on the upper end thereof by the set screw 14, and a similar steam drum 15 secured to the lower end thereof in like manner. A steam supply pipe 16 extends over the top of the wheel and terminates in a downwardly extending pipe section 17 which communicates through a stuffing box 18 with the steam drum 13 so as to afford a tight joint, permitting the steam drum to rotate around the pipe section 17. A steam gauge 19 is connected with the inlet pipe 16 and located at a convenient point so as to be readily observed by the machine operator.

The steam drum 15 has a discharge pipe 20 connected therewith through an upward extension 21, which latter is concentric with the axis of the wheel 4 and connected through the stuffing box 22 with the steam drum, so that the latter may rotate about the upturned end 21 of the discharge pipe.

A plurality of roller molds 23 are secured in upright position and in close relation around the rim 4 of the wheel, the latter being preferably provided with a band 24 around the upper edge, against which the barrel or steam jacket casing of each mold is clamped. For clamping the molds in place around the wheel rim 4, I provide a pair of vertically spaced clamping blocks 25 between each adjacent pair of molds 23, which blocks have the ends curved, as indicated at 26 in Fig. 2, to fit the steam casing of each mold, and each clamping block has a bolt 27 inserted therethrough intermediate of the ends, and also inserted through properly positioned perforations 28 in the wheel rim 4 and provided with nuts 29 on their inner ends bearing against the inner face of the wheel rim 4 so as to draw the clamping blocks 25 inwardly and clamp the molds on the outer face of the wheel rim.

All of the molds are alike and each comprises a tube 30 of suitable length and diameter to serve as a mold, and this tube is surrounded by a pipe section 31 so as to afford a chamber 32 therebetween. Upper and lower heads or caps 33 and 34 are threaded respectively on the upper and lower ends of the pipe section 31, and each is formed with an aperture surrounded by a seat 35 which receives the end of the tube 30 and affords a tight fit when the heads 33 and 34 are screwed on the ends of the pipe section 31.

The wringer rolls are formed of a shaft 36 around which a sheet of raw rubber is wrapped, as shown in Fig. 9, so that the shaft projects beyond each end of the rubber wrapping, and plugs 37 and 38, which are inserted in the upper and lower ends respectively of the tube 30 after the unvulcanized roller is inserted therein, have the openings 39 and 40 respectively therethrough to accommodate the ends of the shaft 36.

The lower plug 38 is formed with a pair of side wings 41 at diametrically opposite sides which fit up against the lower face of the bottom cap 34 and are reversely notched, as at 42, to engage headed pins 43 which are secured to the bottom cap 34 in any suitable manner, so as to securely hold the plug 38 in position when the notches of the side wings 41 are engaged therewith. One of the side wings is formed with a socket 44 to receive the end of a bar or rod, so that the plug 38 may be conveniently and readily turned, after the vulcanizing operation, to release the engagement of the side wings 41 with the pins 43.

At the upper end of the mold a pair of bars 45 are secured to the cap 33 at diametrically opposite points and extend thereabove, and these bars are formed with threaded stems at their upper ends to take the nuts 46. A cross plate 47 has a perforation at one end engaged on one of the stems 45 between a pair of nuts 46, and the other end of this plate is notched, as indicated at 48, to engage the other stem 45 between the pair of nuts 46 thereon. A large cap screw 49 is threaded through a central aperture in the plate 47 and has a bearing plate 50 swiveled onto the lower end thereof, as indicated at 51, so as to bear against the upper end of the block 37 for forcing the latter down into the upper end of the tube 30. The plate 47 may, if desired, have a re-inforcing plate 52 secured to the underside thereof at the point where the cap screw 49 passes therethrough so as to increase the engagement of the threads.

Steam is communicated to the chamber 32 of each mold by individual supply pipes 53 leading from the steam drum 13 to the upper end of the pipe section 31 of each mold, and a discharge or drain pipe 54 connects with the bottom cap 34 of the mold and is connected to the other steam drum 15 at the center of the wheel. Valves 55 and 56 respectively are interposed in the steam supply and drain pipes 53 and 54 so that any of the molds may be cut out of the heating system when required.

In order to permit escape of vapors and afford relief in case of excessive pressure in the mold during vulcanization, each of the plugs 37 and 38 is formed with a number of grooves 57 around the periphery thereof, as indicated in Figs. 4 and 6.

In using this machine, it is contemplated that the wheel 4 will be rotated, and the operator or operators stand at a certain position for the purpose of filling the molds and removing the finished rolls therefrom. In order to impart movement to the wheel, there is a notched wheel 58 journaled on a vertical shaft 59 in a suitable bracket 60 at one side of the machine, so that the notches of the wheel engage the molds, as indicated at Fig. 13, and co-operate therewith to form, in effect, a geared connection of the notched wheel 58 with the mold wheel 4. The wheel 58 has the beveled gear 61 on the underside in mesh with a beveled pinion 62 on a horizontal shaft 63, which latter is suitably journaled in bearings 64 and extends outwardly to a position of convenient access by the operator, and has a handle 65 on the end whereby the shaft 63 is rotated.

Mounted above the circular path of travel of the molds 23, in suitable position to permit proper filling and emptying of the molds, is a filling mechanism indicated as a whole at 66, and an ejecting mechanism indicated as a whole at 67. These mechanisms are alike and each comprises a supporting frame 68 in which a rack bar 69 is mounted for vertical movement directly above and in alignment with each mold 23 as it is moved to a predetermined filling or discharging position. A driving shaft 70 is connected with any suitable source of power and connected by a reduction gear 71 with the rack bar 69, so that the latter may at the will of the operator be projected downwardly when required. A bar 72 which is drilled at the lower end as indicated at 73, so as to receive the upper end of the shaft 36 therein, is adapted in the filling and ejecting operations to be interposed between the lower end of the rack bar 69 and the upper end of the roller so as to transmit the pressure of the rack bar to the roller. The operation of the mechanism for raising and lowering the rack bars 69 may be effected in any desired manner, as for example, in the present structure the driving belt 80 is arranged to loosely engage the pulley 76, so that the latter is normally free to turn, and a weight 77 has a suspending cord 78 wound on the shaft 70 or a drum thereon, if desired, so as to normally rotate the shaft 70 to elevate the rack bar 69. A belt tightener 79 is controlled by the operator so as to be pressed against the belt, when desired, so as to cause the belt to engage the pulley 76 and operate the mechanism to project the rack bar 69 downwardly, after which operation, the release of the belt tightener, permits the weigh 77 to act and elevate the rack bar.

In using this machine and carrying out my process, steam is admitted through the supply pipe 16 to the steam chamber 32 of each mold through the steam drum 13 and the individual pipes 53. The steam is maintained at a proper pressure to properly heat the molds, and the used steam and condensation are discharged from the molds through the individual discharge pipes 54 and the lower drum 15. Shafts 36 are wrapped intermediate of their ends with a covering of raw sheet rubber, as shown in Fig. 9, and are inserted in the molds, one at a time, for vulcanizing. The shafts 36 may, if desired, have the ends turned down, as indicated at 74, to a smaller diameter than the intermediate portion and adapted to receive washers 75 thereon against the shoulders thus formed, for determining the proper length of the rubber covering. After the shaft has been wrapped and the washers placed in position, the lower end of the prepared roller is fitted into the upper end of the mold tube 30, below the filling mechanism 66, the upper plug 37 having been removed and the lower plug 38 having been locked in position. The bar 72 is then engaged onto the upper end of the roller shaft 36, and the upper end of this bar engaged with the lower end of the power-driven rack bar 69, which latter is then set in operation and forces the prepared roller down into the mold tube 30. The bar 72 is then removed and the upper plug 37 inserted onto the upper projecting end 74 of a shaft 36. The clamp plate 47 is then swung around on the stem 45, so that the notched end engages between the nuts 46 of the other stem 45, and, if desired, the upper nut may be tightened down against the clamp plate to hold the latter against displacement. The swinging of the clamp plate into this position moves the cap screw 49 and swivel plate 50 directly over the upper end of the plug 47, whereupon, by turning the cap screw 49, the plug 37 is forced down and held in the proper position to place the rubber covering 76 under a suitable tension, so that, upon vulcanizing same, the softened rubber will completely fill the mold between the plugs 37 and 38 and form a smooth cylindrical rubber roller.

After each mold is filled, the wheel 4 is turned by operating the handle 65 so as to bring the next succeeding mold to the filling position, and the same operation brings one of the filled molds to the position below the ejecting mechanism 66, so that at the same time that one of the molds is being filled, one of the other molds may be emptied. I prefer to provide the wheel with the proper number of molds, so that the time required in normal operation to advance each mold from the filling position to the ejecting position is the proper length of time to completely vulcanize the rubber for forming a roller of the required elasticity. The ejecting of the rollers is accomplished by first rotating the plug 38, a bar being inserted in the socket 44 for this purpose, if desired, and the upper plug 37 is also released and is removed in the reverse manner of its assembling. The bar 72 is then inserted on the upper projection of the shaft 36 and the upper end of the bar engaged against the lower end of the rack 69 of the ejecting mechanism 66, which latter is then set in operation and forces the vulcanized roller out at the lower end of the mold 2. The bar 72 is preferably of a suitable size to fit closely within the tube 30, so that the rubber roller is thoroughly cleared out of the tube and pieces of rubber are prevented from adhering to the walls of the mold.

From the foregoing it will be observed that the molds are all mounted on the revolving wheel, and that also the period of time of the ejecting and filling operations is comparatively short, and steam is maintained in the steam jackets of the molds at all times, thereby avoiding the waste of steam, the cooling and reheating of the molds, and the loss of time in handling the molds which occurs in other methods heretofore employed for making rubber rollers.

While I have shown and described my invention in a certain form, I am aware that various changes and modifications may be made without departing from the principles of my invention, the scope of which is to be determined by the appended claims.

I claim as my invention:

1. In an apparatus of the class described, the combination of a support, a tubular mold mounted on the support, means for closing the ends of the mold and applying pressure to the contents thereof, a casing enclosing the mold so as to form a chamber therearound, means for introducing steam into the chamber, and mechanism movable lengthwise of the mold for forcing the contents therefrom.

2. In an apparatus of the class described, the combination of a support, a tubular mold mounted on the support, mechanism for forcing an unvulcanized roll endwise into the mold at one end and for ejecting the vulcanized roll from the other end, detachable closing means at each end of the tube for retaining the roll in the mold under pressure, and a casing forming a steam jacket around the mold for vulcanizing the roll therein.

3. In a device for vulcanizing a rubber covering on an intermediate portion of a shaft, the combination of a tubular mold, a casing surrounding the mold so as to form a heating chamber around the latter, means for introducing a heating element into the casing, and closing means for the ends of the mold adapted to telescope the shaft and compress the rubber covering on the shaft in the mold.

4. In an apparatus of the class described, the combination of a rotatable frame, a plurality of tubular molds mounted on and arranged in series around the periphery of the frame, means for heating the molds during rotation of the frame, detachable closing means for the ends of the molds adapted to compress the contents of the molds therein, and mechanism mounted adjacent the path of the molds and having a plunger movable lengthwise of the molds for ejecting the contents therefrom.

5. In an apparatus of the class described, the combination of a rotatable frame having a plurality of tubular molds mounted on the periphery thereof, means for heating the molds during rotation of the frame, a filling mechanism adjacent the path of the molds for inserting a roller endwise into the mold, and an ejecting mechanism adjacent the path of the molds for forcing the roller therefrom.

6. In an apparatus of the class described, the combination of a plurality of tubular molds, means for advancing the molds successively to filling and ejecting positions, a filling mechanism at the filling position for inserting rollers consecutively into the molds, and an ejecting mechanism at the ejecting position adapted to eject the rollers consecutively from the molds.

7. In an apparatus of the class described, the combination of a plurality of tubular molds adapted to be moved in a predetermined path, filling and ejecting mechanism adjacent the path of the molds having a reciprocating member movable lengthwise of the molds for inserting a roller in each mold and ejecting same therefrom, and mechanism for advancing the molds step by step so that the latter are consecutively positioned to be operated upon by the filling and ejecting mechanism.

SIMON E. SCHROEDER.